United States Patent
Ying et al.

(10) Patent No.: US 7,339,530 B2
(45) Date of Patent: Mar. 4, 2008

(54) ANTENNA FOR A PORTABLE COMMUNICATION DEVICE EQUIPPED WITH A HINGE

(75) Inventors: Zhinong Ying, Lund (SE); Göran Schack, Åhus (SE); Mats Kleverman, Helsingborg (SE)

(73) Assignee: Sony Ericcson Mobile Communications AB, Lund (SE)

( * ) Notice: Subject to any disclaimer, the term of this patent is extended or adjusted under 35 U.S.C. 154(b) by 162 days.

(21) Appl. No.: 10/572,197

(22) PCT Filed: Aug. 12, 2004

(86) PCT No.: PCT/EP2004/009030

§ 371 (c)(1),
(2), (4) Date: Mar. 15, 2006

(87) PCT Pub. No.: WO2005/027264

PCT Pub. Date: Mar. 24, 2005

(65) Prior Publication Data

US 2007/0115185 A1   May 24, 2007

Related U.S. Application Data

(60) Provisional application No. 60/505,391, filed on Sep. 23, 2003.

(30) Foreign Application Priority Data

Sep. 16, 2003   (EP) .................................. 03020907

(51) Int. Cl.
*H01Q 1/24* (2006.01)

(52) U.S. Cl. ............................... 343/702; 343/700 MS
(58) Field of Classification Search ................ 343/702, 343/846, 848, 700 MS, 906
See application file for complete search history.

(56) References Cited

U.S. PATENT DOCUMENTS

| 5,561,437 | A | | 10/1996 | Phillips et al. .............. 343/702 |
| 5,995,052 | A | * | 11/1999 | Sadler et al. ............... 343/702 |
| 6,272,356 | B1 | | 8/2001 | Dolman et al. ............. 455/550 |
| 2004/0027298 | A1 | * | 2/2004 | Iguchi et al. ............... 343/702 |
| 2005/0231431 | A1 | * | 10/2005 | Pan ........................... 343/702 |
| 2006/0232480 | A1 | * | 10/2006 | Lindell ...................... 343/702 |
| 2007/0120748 | A1 | * | 5/2007 | Jenwatanavet et al. ..... 343/702 |

FOREIGN PATENT DOCUMENTS

| EP | 1107352 | 6/2001 |
| EP | 1329981 | 7/2003 |
| WO | 93/18591 | 9/1993 |

* cited by examiner

*Primary Examiner*—Hoanganh Le
(74) *Attorney, Agent, or Firm*—Myers Bigel Sibley & Sajovec, P.A.

(57) ABSTRACT

A portable communication device and an antenna system include a part having a ground plane located within and extending through the part. A hinging section is joined to the part and stretches along an end of the part for providing rotation of the part in relation to another part around an axis and providing a hinge cavity inside the hinging section surrounding the axis. An antenna element is at least partly provided inside the hinge cavity and the ground plane extends from the part into the hinge cavity at a distance from the antenna element.

13 Claims, 2 Drawing Sheets

US 7,339,530 B2

ANTENNA FOR A PORTABLE COMMUNICATION DEVICE EQUIPPED WITH A HINGE

RELATED APPLICATIONS

The present application is a 35 U.S.C. §371 national phase application of PCT International Application No. PCT/EP2004/009030, having an international filing date of Aug. 12, 2004 and claiming priority to European Patent Application No. 03020907.6, filed Sep. 16, 2003 and U.S. Provisional Application No. 60/505,391 filed Sep. 23, 2003, the disclosures of which are incorporated herein by reference in their entireties. The above PCT International Application was published in the English language and has International Publication No. WO 2005/027264.

TECHNICAL FIELD OF THE INVENTION

The present invention relates to the field of antennas and more particularly to a portable communication device with a hinge including an in-built antenna as well as an antenna system.

DESCRIPTION OF RELATED ART

There is a trend within the field of portable communicating devices, and especially within the field of cellular phones to have the antenna in-built in the phone itself. At the same time the frequency bands needed for such phones need to be broad, which is in many cases a conflicting interest.

The phones are also becoming smaller and smaller, with a need to use the space of the phone as effectively as possible. Then there is a need to provide the antenna element in unused parts of the phone in order to make room for other units or to enable further size reduction. One such place, where an antenna can be placed is the hinge. The document U.S. Pat. No. 6,272,356 describes using a spring member within a hinging section of a cellular phone as an antenna.

Normal antennas in cellular telephony are so called PIFA (planar Inverted-F Antennas). These require the provision of the antenna element above a ground plane. WO 02/25769 describes a PIFA antenna for a cellular terminal, which uses a hinge plate as an antenna element. However, here the hinge plate is provided in the first part of the phone and thus no real space is saved in the first part.

There is furthermore a trend towards clamshell phones, which have two parts hingedly connected to each other via a hinging section. Each part is then often made very thin, which makes the provision of in-built PIFA antennas having good characteristics in such phones hard, since there is needed a certain antenna volume defined by the distance between ground plane and antenna element in order to guarantee good brand properties.

There is therefore a need for providing an in-built antenna for a portable communication device, which saves space for other components and units in the phone and that can be

SUMMARY OF THE INVENTION

The present invention is directed towards solving the problem of providing an in-built antenna in a portable communication device, which saves space in the device and can be used as a PIFA-antenna.

One object of the present invention is thus to provide a portable communication device having an in-built antenna, which saves space in the device and where the antenna can be used as a PIFA antenna.

According to a first aspect of the present invention, this object is achieved by a portable communication device comprising:
- a first part comprising a ground plane located within and extending through the first part, and
- a hinging section joined to the first part, stretching along an end of the first part for providing rotation of the first part in relation to a second part around a first axis and providing a hinge cavity inside the hinging section surrounding said axis,
- wherein an antenna element is at least partly provided inside the hinge cavity and the ground plane stretches from the first part into the hinge cavity at a distance from the antenna element.

A second aspect of the present invention is directed towards a portable communication device including the features of the first aspect, wherein the antenna element includes at least two electrical connecting points for connection to the ground plane and to a radio circuit of the device.

A third aspect of the present invention is directed towards a portable communication device including the features of the first aspect, further comprising a second part connected to the first part via the hinging section.

A fourth aspect of the present invention is directed towards a portable communication device including the features of the third aspect, wherein the hinging section has a thickness, which is larger than the thickness of the first part.

A fifth aspect of the present invention is directed towards a portable communication device including the features of the first aspect, wherein the ground plane is provided with a bent section provided within the hinge cavity and bent away from the part of the ground plane provided in the first part for providing an increased distance between the ground plane and the antenna element in the hinge cavity.

A sixth aspect of the present invention is directed towards a portable communication device including the features of the fifth aspect, wherein the bent section of the ground plane is curved.

A seventh aspect of the present invention is directed towards a portable communication device including the features of the fifth aspect, wherein the bent section of the ground plane is provided along at least parts of a wall of the hinge cavity.

An eighth aspect of the present invention is directed towards a portable communication device including the features of the first aspect, wherein the antenna element is bent along a wall of the hinging section provided essentially opposite the ground plane.

A ninth aspect of the present invention is directed towards a portable communication device including the features of the first aspect, wherein the antenna element is a multiband antenna element essentially provided in the hinge cavity.

A tenth aspect of the present invention is directed towards a portable communication device including the features of the ninth aspect, wherein the multiband antenna has at least two sections of which one is provided at a lateral side wall of the hinge cavity.

An eleventh aspect of the present invention is directed towards a portable communication device including the features of the first aspect, wherein the hinge cavity comprises another functional element of the device between antenna element and ground plane.

A twelfth aspect of the present invention is directed towards a portable communication device including the features of the first aspect, wherein it is a cellular phone.

Another object of the present invention is to provide an antenna system, which saves space in the device it is to be placed in and that can be used as a PIFA antenna.

According to a thirteenth aspect of the present invention, this object is achieved by an antenna system for provision in a portable communication device, said device having a first part and a hinging section joined to the first part, stretching along an end of the first part for providing rotation of the first part in relation to a second part around a first axis, said hinging section provided with a hinge cavity in the interior surrounding said axis, said antenna system comprising:

a ground plane to be located within and extending through the first part, and an antenna element for provision at least partly inside the hinge cavity, wherein the ground plane is dimensioned for stretching from the first part into the hinge cavity at a distance from the antenna element.

The invention has the following advantages. It saves space within the first part of the portable communication device, which can be used for other purposes, like more components and other units. When, according to the fifth aspect of the present invention, the section of the ground plane of the device provided in the hinging section is bent away from the ground plane in the first part, a larger antenna volume is obtained, which enhances the broadband characteristics of the device. When, according to the ninth aspect of the present invention, a multiband antenna element is used each element can, because of the shape of the cavity where the ground plane and/or antenna element section is placed, be placed at a distance which best fits the properties of the frequency band the section is supposed to serve, which gives a better performance for each separate band. The eleventh aspect of the present invention provides the additional advantage of further enabling size reduction of the device, since the hinging section is used for receiving additional elements of the device.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable communication device according to the invention will now be described in relation to a cellular phone, which is a preferred variation of the invention. The phone is furthermore preferably a so-called clamshell phone, but can be other types of phones provided they are fitted with a hinging section. The portable communication device can also be another type of device though, like a cordless phone, a communication module, a PDA or any other type of portable device communicating with radio waves.

Figure 1:
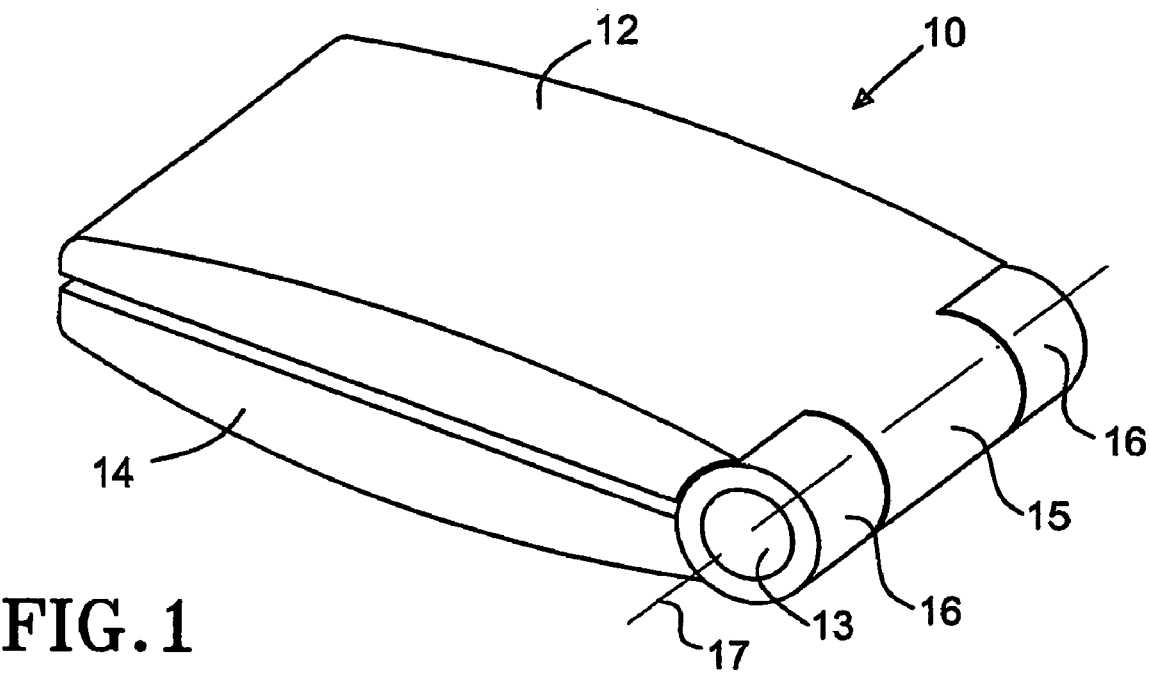
FIG. 1 schematically shows a perspective view of a clam-shell phone according to the invention in a closed position.

FIG. 1 schematically shows a perspective view of a clamshell phone according to the invention. The phone 10 includes a first and a second part 12 and 14, where the second part 14 can be rotated round the bottom end of the first part 12. The phone is for this reason provided with a hinging section 15, 16 defining an axis 17 of rotation provided along the bottom end side of the phone. The hinging section therefore stretches along an end of both the first and the second parts. The first and second parts are joined to each other by conventional hinging elements provided in the hinging section. The hinge is normally provided by providing a first hinging element at the end of the first part in the form of two taps 13 (of which one is shown) extending in opposite directions along the axis 17, which taps mate with corresponding recesses of two second hinging elements 16 in the second part, which recesses are thus provided on different sides of the taps along the axis 17. The taps are here provided on each side of an essentially cylindrical body 15 having a hollow cavity joined to the first part. It should however be realised that other types of hinges are equally as well possible. In the figure the phone is shown in a closed position. Here it is worth noting that there is no antenna protruding from the phone. The antenna is in-built.

Figure 2:
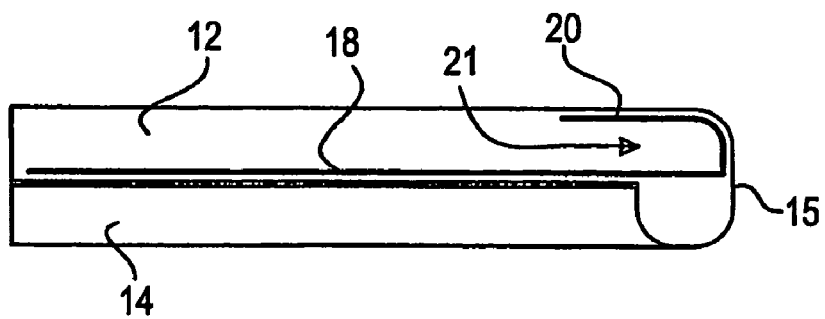
FIG. 2 shows a side view of an antenna element and ground plane according to a first embodiment of the invention provided in a first part and in a hinging section of the clam-shell phone.

FIG. 2 schematically shows a side view of the phone according to a first embodiment of the invention, where the relevant elements are shown. The interior of the first part is joined to the first hinging element 15 via a cavity 21 provided therein. The cavity has an opening, which faces the interior of the first part. The cavity is in this embodiment essentially cylindrical in shape and here formed as three quarters of a cylinder stretching around the axis of rotation along the bottom end of the phone. The first part 12 includes a ground plane 18, which stretches throughout the first part along a side of the first part facing inwards, i.e. facing the second part of the phone when the phone is in the closed position. The ground plane 18 stretches straight into the cavity 21 of the hinging element 15. An antenna element 20 is provided in the form of a plate aligned with the lower part of the ground plane essentially along the bottom end side, i.e. where the hinging section is provided. The antenna element is distanced from the ground plane and is therefore provided close to a side of the first part that is facing outwards, i.e. facing away from the second part in the closed position. The antenna element likewise stretches from the first part into the cavity of the hinging section the same distance into the cavity as the antenna element 20. In this way an antenna volume is defined between the element and the ground plane. The antenna element 20 is connected via electrical leads to both the ground plane and to a radio circuit (not shown) provided in the phone for enabling transmission at suitable frequencies. The antenna is therefore a so-called PIFA antenna. In this way the first section is relieved from space, which can be used for other units in the first part, which is in many instances small and has to include lots of units for providing all sorts of different functions and features of the phone. It is furthermore possible to even further reduce the size of phone because of this saved space. As is evident from FIG. 2 the thickness of the hinging section is substantially equal to the combined thickness of the first and second parts of the phone.

Figure 3:
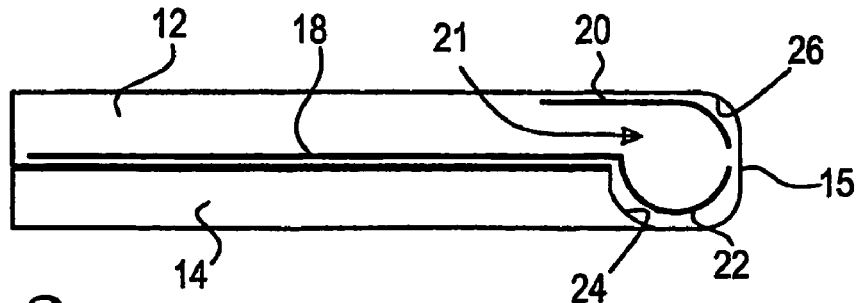
FIG. 3 shows a side view of an antenna element and ground plane according to a second embodiment of the invention for provision in a first part and hinging section of the clam-shell phone, FIG. 4 schematically shows a perspective view of the ground plane and antenna element according to a third embodiment of the invention for provision in a first part and a hinging section of a clam-shell phone according to the invention, and FIG. 5 schematically shows a perspective view of the ground plane and antenna element according to a fourth embodiment of the invention for provision in a first part and a hinging section of a clam-shell phone according to the invention.

FIG. 3 shows a side view of a phone according to a second embodiment of the invention in the same view as in FIG. 2. The first part 12 is joined to the cavity of the hinging element 16 in the same way as in FIG. 2, which element has substantially the same thickness as the combined first and second parts. Thus the hinging section has a thickness that is substantially the same as the thickness of the combined first and second parts. It can be smaller though. It should however have a thickness that is larger than the thickness of the first part. The ground plane 18 also stretches into the cavity 21. Here the part 22 of the ground plane provided in the hinge cavity 21 is bent away from the part of the ground plane provided in the first part 12. The bent section 22 is furthermore curved and provided along a bottom wall 24 of the cavity 21, which cavity has a semi-cylindrical shape as was mentioned earlier. The bent section 22 of the ground plane is shaped like half a cylinder. The antenna element 20 is provided as a plate with two sections integral with each other, where a first section has a straight form and the second section has a curved form provided at its furthest end and there formed as roughly a quarter of a cylinder, provided along a second opposite wall 26 of the cavity 21. In this way a larger mean distance between the antenna and ground plane is obtained, thus realising a larger antenna volume, which is beneficial from a broadband characteristic point of view, especially since the first and second parts of the phone are relatively thin in clamshell phones. In addition to saving space this embodiment therefore also provides better broadband characteristics because of the increased antenna volume. The antenna element was here curved at the end, but it is equally as well possible to provide the element as a straight plate, which modification can also be done in the first described embodiment.

Figure 4:
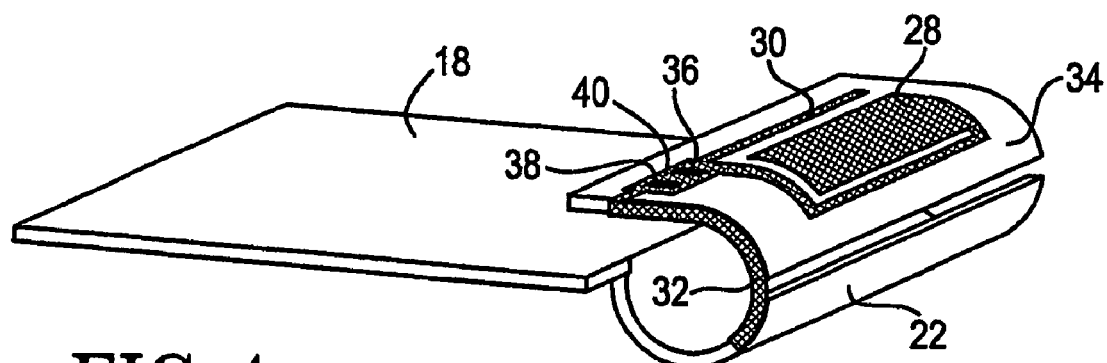

FIG. 4 shows a perspective view of the interior of the first part of the phone according to a third embodiment of the invention. Here it can be seen that the ground plane has a smaller width at the bottom curved end for provision in the hinging element than in the rest of the first part of the phone. The reason for this is to make space for the recesses of the second part of the phone, which are adapted to receive the taps (not shown) of the first hinging element. Also here the ground plane 18 is provided with a curved half cylinder 22 for provision against the cavity wall. The actual hinging element including said taps and the cavity is provided by the casing of the phone. The difference here compared to the second embodiment is that the antenna element is a multi-band antenna element having three different sections of which two 28 and 30 are provided on a plastic film 34 intended to face the upper cavity wall provided by the casing. A third section 32 is provided on a lateral side end of the cavity. The antenna element has two feeding lines 36 and 38 for connection to the radio circuits and to the ground plane 18. A first long one 28 of the sections provides communication in one frequency region, and in this embodiment the GSM 900 band, while a second short one 30 provides communication in another frequency region and here the UMTS frequency band. A third section 32 is provided onto the circular lateral end side of the cylindrical cavity for a third frequency region and is in this embodiment provided for the DCS band. This element 32 is preferably etched onto the casing of the first part of the phone. Feeding and grounding 36 and 38 of the antenna element is provided in a joining section 40 provided in-between these three sections. Apart from the previously described advantages, this structure provides the additional advantage of providing different distances between ground plane and antenna sections, which distances can be dimensioned for better efficiency according to the frequency band in which they are to function. The provision of the third antenna section on the lateral end side of the cavity furthermore allows the first and second antenna sections to be made larger or have more intricate patterns than what would otherwise be possible. The antenna furthermore functions well both when the phone is opened and closed. In this embodiment the antenna element is wholly provided in the hinging section.

There is a semi-cylindrical space provided in-between the antenna element and the ground plane of the hinging section. This space can further be used for placing of additional units of the phone, like for instance the lens of a camera. In this way further saving of space is achieved.

Figure 5:
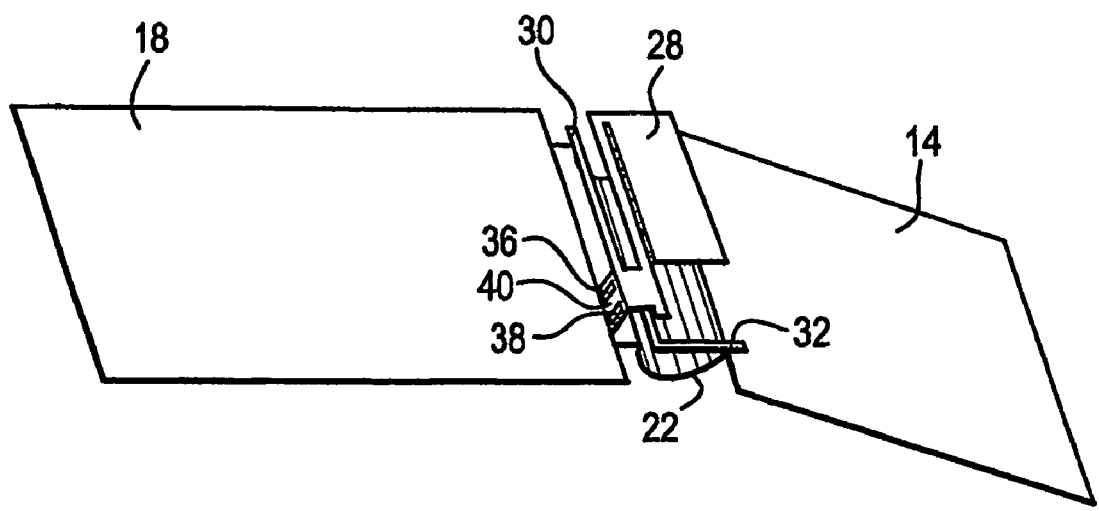

FIG. 5 shows a perspective view of antenna elements, ground plane, feeding lines as well as the second part of the phone according to a fourth embodiment of the invention. The second part 14 is simplified and only shown in the form of a plate for better understanding of the invention. The phone is here in the open position. The antenna element is here a multiband antenna element but somewhat different from the element in FIG. 4. First of all the first and second sections 28, 30 are not curved but provided in the same plane. The structure of the first section 28 is somewhat different from in FIG. 4, but provides essentially the same characteristics. The third section 32 has a different structure. It has a first part stretching straight out from the joining section 40 towards the end surface and is there joined with a second generally L-shaped part, provided at the lateral end side of the cylinder volume. In all other respects this embodiment is similar to the embodiment in FIG. 4, and provides the same advantages.

The antenna structure according to the invention has several advantages. It saves space within the first part of the phone, which can be used for other purposes, like more components and other units. When the section of the ground plane of the phone provided in the hinging section is bent away from the ground plane in the first part, a larger antenna volume is obtained, which enhances the broadband characteristics of the phone. When a multiband antenna element is used each element can, because of the curvature of the cavity where the ground plane and/or antenna element section is placed, be placed at a distance which best fits the properties of the frequency band the section is supposed to serve, which gives a better performance for each separate band. The volume between ground plane and antenna element in the hinging section can also be used for placing additional elements of the phone. Yet another advantage is that by this placing of the ground plane and the antenna element it is possible to make the phone not to radiate as much towards the body of a user, which makes the antenna more efficient so that energy is not wasted on this unnecessary radiation.

The present invention can be varied in many ways in addition to those mentioned in relation to different embodiments of the invention. It is possible to add further separate antenna elements close to the hinging section for providing an extra UMTS antenna in case the dimensions of the antenna volume provided in the hinge is too small. If it is large enough the antenna in FIGS. 4 and 5 can be used for four different frequency bands like for instance also PCS in addition to those already mentioned. The cavity needs not be cylindrical, but can have any other suitable shape. It is however good if it has a height that is larger than the highest possible distance between antenna element and ground plane provided in the first part of the phone. The ground plane, when bent, need not have cylindrical curvature, but other ways of providing an increased distance can just as well be used, like through two perpendicular plates providing an L-shaped cross-section. More or fewer parts of the antenna element can furthermore be designed in a straight or curved structure. The antenna element can also be provided wholly in the hinge section or also be provided partly in the first part. It is also possible to provide more or fewer antenna sections than described, all depending on the number of frequency bands where transmission is desired. Finally the cavity need not be provided in a central first element, but can be provided in any type of hinging element. Thus the present invention is only to be limited by the following claims.

The invention claimed is:

1. A portable communication device comprising:
   a first part comprising a ground plane located within and extending through the first part, and
   a hinging section joined to the first part, stretching along an end of the first part for providing rotation of the first part in relation to a second part around a first axis and providing a hinge cavity inside the hinging section surrounding the axis,
   wherein an antenna element is at least partly provided inside the hinge cavity and the ground plane extends from the first part into the hinge cavity at a distance from the antenna element.

2. A portable communication device according to claim 1, wherein the antenna element includes at least two electrical connecting points for connection to the ground plane and to a radio circuit of the device.

3. A portable communication device according to claim 1, further comprising a second part connected to the first part via the hinging section.

4. A portable communication device according to claim 3, wherein the hinging section has a thickness, which is larger than a thickness of the first part.

5. A portable communication device according to claim 1, wherein the ground plane is provided with a bent section provided within the hinge cavity and bent away from a part of the ground plane provided in the first part for providing an increased distance between the ground plane and the antenna element in the hinge cavity.

6. A portable communication device according to claim 5, wherein the bent section of the ground plane is curved.

7. A portable communication device according to claim 5, wherein the bent section of the ground plane is provided along at least parts of a wall of the hinge cavity.

8. A portable communication device according to claim 1, wherein the antenna element is bent along a wall of the hinging section provided essentially opposite the ground plane.

9. A portable communication device according to claim 1, wherein the antenna element is a multiband antenna element essentially provided in the hinge cavity.

10. A portable communication device according to claim 9, wherein the multiband antenna has at least two sections of which one is provided at a lateral side wall of the hinge cavity.

11. A portable communication device according to claim 1, wherein the hinge cavity comprises a functional element of the device between the antenna element and ground plane.

12. A portable communication device according to claim 1, wherein the device is a cellular phone.

13. An antenna system for provision in a portable communication device, the device having a first part and a hinging section joined to the first part, stretching along an end of the first part for providing rotation of the first part in relation to a second part around a first axis the hinging section provided with a hinge cavity in the interior surrounding the axis and comprising:
   a ground plane to be located within and extending through the first part, and
   an antenna element for provision at least partly inside the hinge cavity, wherein the ground plane is dimensioned for extending from the first part into the hinge cavity at a distance from the antenna element.

* * * * *

UNITED STATES PATENT AND TRADEMARK OFFICE
CERTIFICATE OF CORRECTION

PATENT NO. : 7,339,530 B2  Page 1 of 1
APPLICATION NO. : 10/572197
DATED : March 4, 2008
INVENTOR(S) : Ying et al.

It is certified that error appears in the above-identified patent and that said Letters Patent is hereby corrected as shown below:

Column 7, Claim 3, Line 37: According to Examiner Amendment dated 10/14/2007 please correct "1, further comprising a second part connected"
  To read -- 1, wherein the second part is connected --

Column 8, Claim 13, Line 32: Please correct "around a first axis the"
  To read -- around a first axis, the --

Signed and Sealed this

Twenty-fourth Day of June, 2008

JON W. DUDAS
*Director of the United States Patent and Trademark Office*